US 12,132,665 B2

United States Patent
Friedman et al.

(10) Patent No.: US 12,132,665 B2
(45) Date of Patent: Oct. 29, 2024

(54) HANDLING OF OUT-OF-ORDER TRANSPORT-LAYER PACKETS USING REORDER BUFFER

(71) Applicant: MELLANOX TECHNOLOGIES, LTD., Yokneam (IL)

(72) Inventors: Yamin Friedman, Jerusalem (IL); Idan Burstein, Carmiel (IL); Ariel Shahar, Jerusalem (IL); Roee Moyal, Yokneam Illit (IL); Gil Kremer, Hadera (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/990,768

(22) Filed: Nov. 21, 2022

(65) Prior Publication Data
US 2024/0171520 A1 May 23, 2024

(51) Int. Cl.
*H04L 47/62* (2022.01)
*H04L 47/6275* (2022.01)
*H04L 49/90* (2022.01)

(52) U.S. Cl.
CPC ........ *H04L 47/624* (2013.01); *H04L 47/6275* (2013.01); *H04L 49/9036* (2013.01)

(58) Field of Classification Search
None
See application file for complete search history.

(56) References Cited

U.S. PATENT DOCUMENTS

| | | |
|---|---|---|
| 6,728,265 B1 | 4/2004 | Yavatkar et al. |
| 6,799,200 B1 | 9/2004 | Blackmore et al. |
| 7,209,994 B1 | 4/2007 | Klaiber et al. |
| 7,222,203 B2 | 5/2007 | Madukkarumukumana et al. |
| 7,302,511 B2 | 11/2007 | Jeyasingh et al. |
| 7,616,563 B1 | 11/2009 | Eriksson et al. |
| 7,826,469 B1 | 11/2010 | Li et al. |
| 7,930,349 B2 | 4/2011 | Hussain et al. |
| 8,175,116 B2 | 5/2012 | Tachibana et al. |
| 8,180,944 B2 | 5/2012 | Serebrin et al. |
| 8,213,315 B2 | 7/2012 | Crupnicoff et al. |
| 8,306,062 B1 | 11/2012 | Cohen |
| 8,566,494 B2 | 10/2013 | Li et al. |
| 8,589,587 B1 | 11/2013 | Michailidis et al. |

(Continued)

FOREIGN PATENT DOCUMENTS

WO 2015074275 A1 5/2015

OTHER PUBLICATIONS

NVIDIA, "CUDA Compute Unified Device Architecture", pp. 1-125, Jun. 23, 2007.

(Continued)

*Primary Examiner* — Alex Skripnikov
(74) *Attorney, Agent, or Firm* — MEITAR PATENTS LTD.

(57) ABSTRACT

An apparatus includes a memory and control circuitry. The control circuitry is configured to receive packets, which are en-route to undergo transport-layer processing in a network device in accordance with a transport protocol that requires arrival of the packets in a sequential order, to detect that one or more of the packets deviate from the sequential order, to buffer the one or more deviating packets in the memory, and, using the memory, to reorder the packets and provide the packets in the sequential order to the network device.

23 Claims, 5 Drawing Sheets

(56) References Cited

U.S. PATENT DOCUMENTS

| | | |
|---|---|---|
| 8,886,862 B2 | 11/2014 | Kagan |
| 8,897,132 B2 | 11/2014 | Feroz et al. |
| 8,949,498 B2 | 2/2015 | Kagan |
| 8,996,718 B2 | 3/2015 | Biswas |
| 9,112,819 B2 | 8/2015 | Gopinath et al. |
| 9,178,805 B2 | 11/2015 | Goel |
| 9,306,793 B1 | 4/2016 | Craft et al. |
| 9,391,956 B2 | 7/2016 | Touboul |
| 9,571,354 B2 | 2/2017 | Annamalaisami et al. |
| 9,916,269 B1 | 3/2018 | Machulsky et al. |
| 9,965,412 B2 | 5/2018 | Liu et al. |
| 9,965,441 B2 | 5/2018 | Sajeepa et al. |
| 10,015,104 B2 | 7/2018 | Pope et al. |
| 10,110,518 B2 | 10/2018 | Burstein et al. |
| 10,380,047 B2 | 8/2019 | Degani |
| 10,387,074 B2 | 8/2019 | Kriss et al. |
| 10,467,161 B2 | 11/2019 | Gilboa et al. |
| 10,505,747 B2 | 12/2019 | Pope et al. |
| 10,505,848 B2 | 12/2019 | Underwood et al. |
| 10,642,775 B1 | 5/2020 | Voks et al. |
| 11,451,647 B2 | 9/2022 | Lariviere et al. |
| 11,533,267 B2 | 12/2022 | Friedman et al. |
| 11,757,796 B2 | 9/2023 | Eran et al. |
| 11,792,139 B2 | 10/2023 | Pismenny et al. |
| 2005/0165985 A1 | 7/2005 | Vangal et al. |
| 2006/0045109 A1 | 3/2006 | Blackmore et al. |
| 2006/0075142 A1 | 4/2006 | Cornett et al. |
| 2006/0182039 A1 | 8/2006 | Jourdain et al. |
| 2008/0294825 A1 | 11/2008 | Mahalingam et al. |
| 2010/0023666 A1 | 1/2010 | Mansell et al. |
| 2010/0070677 A1 | 3/2010 | Thakkar |
| 2010/0115514 A1 | 5/2010 | Maliszewski et al. |
| 2010/0174841 A1 | 7/2010 | Bogin et al. |
| 2010/0191885 A1 | 7/2010 | Serebrin et al. |
| 2010/0191887 A1 | 7/2010 | Serebrin et al. |
| 2010/0191888 A1 | 7/2010 | Serebrin et al. |
| 2010/0191889 A1 | 7/2010 | Serebrin et al. |
| 2010/0271944 A1 | 10/2010 | Michaelis et al. |
| 2010/0333101 A1 | 12/2010 | Pope et al. |
| 2011/0106993 A1 | 5/2011 | Arinobu et al. |
| 2011/0145459 A1 | 6/2011 | Conti et al. |
| 2011/0179417 A1 | 7/2011 | Inakoshi |
| 2012/0079175 A1 | 3/2012 | Flynn et al. |
| 2012/0179742 A1 | 7/2012 | Acharya et al. |
| 2013/0067193 A1 | 3/2013 | Kagan et al. |
| 2013/0315054 A1 | 11/2013 | Shamis et al. |
| 2014/0006667 A1 | 1/2014 | Sun et al. |
| 2014/0040514 A1 | 2/2014 | Li et al. |
| 2014/0143455 A1 | 5/2014 | Hayut et al. |
| 2014/0229946 A1 | 8/2014 | van Riel |
| 2014/0280813 A1 | 9/2014 | Ramachandran et al. |
| 2014/0304352 A1 | 10/2014 | Chaudhary et al. |
| 2014/0310369 A1 | 10/2014 | Makhervaks et al. |
| 2014/0310439 A1 | 10/2014 | Bshara et al. |
| 2015/0127849 A1 | 5/2015 | Luo et al. |
| 2015/0172226 A1 | 6/2015 | Borshteen et al. |
| 2015/0256654 A1* | 9/2015 | Oguchi ............... G06F 11/1451 709/230 |
| 2015/0257159 A1 | 9/2015 | Speicher et al. |
| 2015/0263968 A1 | 9/2015 | Jain et al. |
| 2015/0286594 A1 | 10/2015 | Degani |
| 2015/0304281 A1 | 10/2015 | Kasturi et al. |
| 2016/0057070 A1 | 2/2016 | Saxena et al. |
| 2016/0092238 A1 | 3/2016 | Codrescu et al. |
| 2016/0234127 A1 | 8/2016 | Agarwal et al. |
| 2016/0277478 A1 | 9/2016 | Narasimhamurthy |
| 2016/0286487 A1 | 9/2016 | Sachs et al. |
| 2017/0048320 A1 | 2/2017 | Farmahini-Farahani et al. |
| 2017/0249079 A1 | 8/2017 | Mutha et al. |
| 2018/0004705 A1* | 1/2018 | Menachem ......... H04L 67/1097 |
| 2018/0167168 A1 | 6/2018 | Shoens et al. |
| 2018/0191629 A1 | 7/2018 | Biederman et al. |
| 2018/0191642 A1 | 7/2018 | Biederman et al. |
| 2018/0267919 A1 | 9/2018 | Burstein |
| 2018/0323913 A1 | 11/2018 | Chen |
| 2019/0044994 A1 | 2/2019 | Sarangam et al. |
| 2019/0116127 A1 | 4/2019 | Pismenny et al. |
| 2019/0229903 A1 | 7/2019 | Balasubramanian et al. |
| 2019/0238460 A1 | 8/2019 | Vasudevan |
| 2019/0260686 A1 | 8/2019 | Bowers et al. |
| 2019/0342199 A1 | 11/2019 | Hurson et al. |
| 2019/0387079 A1 | 12/2019 | Pismenny et al. |
| 2020/0068048 A1 | 2/2020 | Hermesh et al. |
| 2020/0117605 A1 | 4/2020 | Cornett et al. |
| 2020/0133909 A1 | 4/2020 | Hefty et al. |
| 2020/0210359 A1 | 7/2020 | Cornett et al. |
| 2020/0313999 A1 | 10/2020 | Lee et al. |
| 2020/0389399 A1 | 12/2020 | Wang et al. |
| 2020/0403919 A1 | 12/2020 | Cui et al. |
| 2020/0412659 A1 | 12/2020 | Arditti Ilitzky et al. |
| 2021/0092069 A1 | 3/2021 | Musleh et al. |
| 2021/0111996 A1 | 4/2021 | Pismenny et al. |
| 2021/0117360 A1 | 4/2021 | Kutch et al. |
| 2021/0243247 A1 | 8/2021 | He et al. |
| 2021/0288910 A1 | 9/2021 | Daly et al. |
| 2021/0297360 A1 | 9/2021 | Park et al. |
| 2021/0320866 A1 | 10/2021 | Le et al. |
| 2021/0328930 A1 | 10/2021 | Nikolaidis et al. |
| 2021/0352023 A1 | 11/2021 | Syrivelis et al. |
| 2022/0021629 A1 | 1/2022 | Yefet et al. |
| 2022/0085916 A1 | 3/2022 | Debbage et al. |
| 2022/0124182 A1 | 4/2022 | Galles et al. |
| 2022/0232072 A1 | 7/2022 | Gerlitz et al. |
| 2022/0283964 A1 | 9/2022 | Burstein et al. |
| 2022/0321478 A1* | 10/2022 | Vasudevan ............ H04L 47/122 |
| 2023/0141761 A1 | 5/2023 | Gerlitz et al. |
| 2023/0259284 A1* | 8/2023 | Han ...................... G06F 3/0646 711/112 |

OTHER PUBLICATIONS

U.S. Appl. No. 16/932,765 Office Action dated Nov. 28, 2023.
Infiniband Trade Association, "InfiniBand™ Architecture Specification", vol. 1, Release 1.3, pp. 1-1842, Mar. 3, 2015.
Friedman, U.S. Appl. No. 17/902,150, filed Sep. 2022.
Mellanox Technologies, "WinOF VPI for Windows", User Manual, pp. 1-117, Rev 4.40, Jul. 9, 2013.
Melllanox Technologies, "Linux/drivers/net/ethernet/mellanox/mlx4/en_cq.c", version 4.1, pp. 1-4, year 2007.
Mellanox Technologies, "Linux/drivers/net/ethernet/mellanox/mlx4/en_netdev.c", version 4.1, pp. 1-41, year 2007.
Intel Corporation, "Linux/drivers/net/ethernet/intel/ixgbe/ixgbe_main.c", pp. 1-92, version 4.1., years 1999-2014.
Intel Corporation, "Intel® Xeon® Processor E5-2600 v31 Product Family", Product brief, pp. 1-5, Aug. 21, 2014.
Kernelnewbies, "Linux4.18—Linux Kernel Newbies", pp. 1-16, Aug. 12, 2018 downloaded from https://kernelnewbies.org/Linux_4.18.
NVMe Over Fabrics standard, "NVM Express over Fabrics," Revision 1.1, pp. 1-82, Oct. 22, 2019.
Rescorla et al., "The Transport Layer Security (TLS) Protocol Version 1.3", Request for Comments 8446, pp. 1-160, Aug. 2018.
Belshe et al., "Hypertext Transfer Protocol Version 2 (HTTP/2)", Request for Comments 7540, pp. 1-96, May 2015.
Microsoft, "Receive Segment Coalescing (RSC)", pp. 1-3, Aug. 31, 2016 downloaded from https://docs.microsoft.com/en-us/previous-versions/windows/it-pro/windows-server-2012-r2-and-2012/hh997024(v=ws.11)#receive-segment-coalescing-rsc-1.
Corbert, "A reworked TCP zero-copy receive API", LWN.net, pp. 1-4, May 18, 2018 downloaded from https://lwn.net/Articles/754681/.
"NVIDIA Mellanox Bluefield-2 Data Processing Unit (DPU)," Product Brief, Mellanox Technologies, pp. 1-4, Aug. 2020.
CN Application # 202110756878.8 Office Action dated Feb. 29, 2024.

\* cited by examiner

HANDLING OF OUT-OF-ORDER TRANSPORT-LAYER PACKETS USING REORDER BUFFER

FIELD OF THE INVENTION

The present invention relates generally to network communication, and particularly to methods and systems for packet reordering.

BACKGROUND OF THE INVENTION

Various network protocols and network devices require that packets are received and processed in sequential order, i.e., in the same order they were transmitted from the packet source. In InfiniBand™, for example, the transport layer is required to process packets in-order. Any out-of-order arrival of a packet results in packet drop and retransmission. The requirement for in-order packet arrival affects protocols that are specified over IB, such as Remote Direct Memory Access (RDMA).

SUMMARY OF THE INVENTION

An embodiment of the present invention that is described herein provides an apparatus including a memory and control circuitry. The control circuitry is configured to receive packets, which are en-route to undergo transport-layer processing in a network device in accordance with a transport protocol that requires arrival of the packets in a sequential order, to detect that one or more of the packets deviate from the sequential order, to buffer the one or more deviating packets in the memory, and, using the memory, to reorder the packets and provide the packets in the sequential order to the network device.

In some embodiments, the transport protocol is Remote Direct Memory Access (RDMA). In an embodiment, in accordance with the transport protocol, the sequential order is defined by packet serial numbers (PSNs) specified in the packets.

In a disclosed embodiment, the control circuitry is configured to reorder and provide the packets, by (i) retaining the one or more deviating packets in the memory until arrival of one or more packets that precede the one or more deviating packets in the sequential order, and only then (ii) providing the one or more packets that precede the one or more deviating packets, followed by the one or more deviating packets.

In an example embodiment, the received packets include respective packet serial numbers (PSNs) that specify the sequential order, and the control circuitry is configured to maintain an Expected PSN (EPSN), and to detect that a received packet deviates from the sequential order by detecting that the PSN of the packet differs from the EPSN.

In another embodiment, the control circuitry is configured to detect that a time that elapsed since initiating buffering of the one or more deviating packets exceeds a defined timeout, and in response cause the network device to request retransmission of the one or more packets that precede the one or more deviating packets.

In some embodiments, the received packets include respective packet serial numbers (PSNs) that specify the sequential order, at least some of the received packets are read responses that are received in response to a read request from the network device, and the control circuitry is configured to obtain from the network device a-priori information indicative of the PSNs of the read responses, and to decide that one or more of the packets deviate from the sequential order based on the a-priori information. In an embodiment, the control circuitry is configured to obtain the a-priori information by monitoring the read request sent by the network device.

In an embodiment, in providing the packets to the network device, the control circuitry is configured to permit packets of one or more predefined types to deviate from the sequential order. In some embodiments, the control circuitry is configured to detect that a received packet deviates from the sequential order, by identifying that the packet is a data packet belonging to a Dynamically Connected (DC) flow for which a connection-request packet was not yet received.

In another embodiment, the received packets are associated with multiple flows, and the control circuitry is configured to detect and buffer the deviating packets, and to reorder and provide the packets, separately for each of the flows. In some embodiments, the control circuitry is configured to maintain, per flow, a respective context that stores one or more of (i) an expected packet serial number (EPSN) for the flow, (ii) a pointer to a memory location that stores the one or more deviating packets belonging to the flow, (iii) a current smallest received packet serial number (PSN) among the packets of the flow, (iv) a list of PSNs of one or more expected read responses, and (v) a highest PSN among the PSNs of received acknowledgement packets.

There is additionally provided, in accordance with an embodiment described herein, a method including receiving packets, which are en-route to undergo transport-layer processing in a network device in accordance with a transport protocol that requires arrival of the packets in a sequential order. A detection is made that one or more of the packets deviate from the sequential order, and the one or more deviating packets are buffered in a memory. Using the memory, the packets are reordered and the packets are provided in the sequential order to the network device.

The present invention will be more fully understood from the following detailed description of the embodiments thereof, taken together with the drawings in which:

DETAILED DESCRIPTION OF EMBODIMENTS

Overview

According to the InfiniBand™ (IB) specifications, the transport layer of a network device must handle incoming packets in sequential order, i.e., in the same order they were sent from the packet source. With conventional packet processing techniques, this requirement is a considerable handicap, for a number of reasons. For example, to retain the sequential order, all packets of a given flow must travel the same path via the network, meaning Adaptive Routing (AR) and multipathing techniques cannot be used. Ruling out the use of AR and multipathing degrades the utilization of network resources. As another example, if a given packet is dropped in the network, all the following packets of the same flow must be dropped, as well, until the given packet is retransmitted and received properly. Such excessive retransmission reduces network bandwidth and increases latency.

Embodiments of the present invention that are described herein provide improved techniques for processing packets en-route to a destination node that requires in-order packet arrival. The disclosed techniques allow packets to arrive Out-Of-Order (OOO) from the network, and at the same time provide the packets in-order to the transport layer of the destination node. As a result, switches in the network are free to use Adaptive Routing (AR) or multipathing as needed. Moreover, to recover from a dropped packet, the packet source is no longer required to retransmit multiple packets, only the individual packet that was dropped.

The embodiments described herein refer mainly to processing of Remote Direct Memory Access (RDMA) packets in IB networks. The disclosed techniques, however, are applicable in any other suitable network or protocol requiring that packets arrive in sequential order (i.e., in the same order the packets were transmitted from the packet source). In the description that follows, by way of example, the destination node comprises an IB Host Channel Adapter (HCA). Alternatively, the destination node may comprise any other suitable network device.

In some embodiments, a packet reordering device is placed in front of the HCA (e.g., immediately upstream from the HCA). The packet reordering device comprises a memory and associated control circuitry. The control circuitry intercepts packets, which are en-route to undergo transport-layer processing in the HCA. Upon detecting that one or more of the packets deviate from the expected sequential order, the control circuitry buffers the deviating packet or packets in the memory. The control circuitry reorders the packets using the memory (e.g., by waiting until all packets that precede the deviating packet or packets arrive), and provides the packets in the sequential order to the HCA.

In an example embodiment, the packets of each flow comprise respective Packet Sequence Numbers (PSNs) that indicate the locations of the packets in the flow. The reordering device maintains a respective context for each flow of packets being processed. Among other parameters, the context comprises an Expected PSN (EPSN) for the flow. For each incoming packet, the reordering device determines the flow to which the packet belongs, and compares the PSN of the packet to the EPSN of the flow. If the PSN is equal to the EPSN, the reordered forwards the packet to the HCA and increments the EPSN in the context. If the PSN of the packet is greater than the EPSN, the reordering device buffers the packet in the memory until a packet whose PSN matches the EPSN arrives. Only then the reordered forwards the buffered packets to the HCA, followed by the packet whose PSN matches the EPSN.

In a typical implementation, the reordering device buffers OOO packets only up to a predefined timeout. If the timeout expires before the buffered packets can be released from the buffer and sent to the HCA, the reordering device sends one or more of the buffered packets (the most recently buffered packet) in spite of the mis-ordering, thereby causing the HCA to request retransmission. Such a timeout mechanism is typically performed per flow.

Various implementation examples are described herein, including detailed operation flows for an HCA serving as an RDMA requestor and an HCA serving as an RDMA responder. Typically, the reordering device is implemented as a "bump-in-the wire", meaning that no modifications are needed in the transport layer of the HCA.

In some embodiments, the reordering device also monitors outgoing packets that are sent from the HCA to the network, e.g., for anticipating the PSNs of RDMA read responses that will arrive in response to an RDMA read request from the HCA. Handling of Dynamically Connected (DC) transport is also addressed.

The disclosed techniques can be used with arbitrary packet types, i.e., they are not limited to specific types of packets. In some embodiments, a "relaxed reordering" is used, for a specific flow or globally, to exclude specific packet types from the reordering requirement.

System Description

Figure 1:
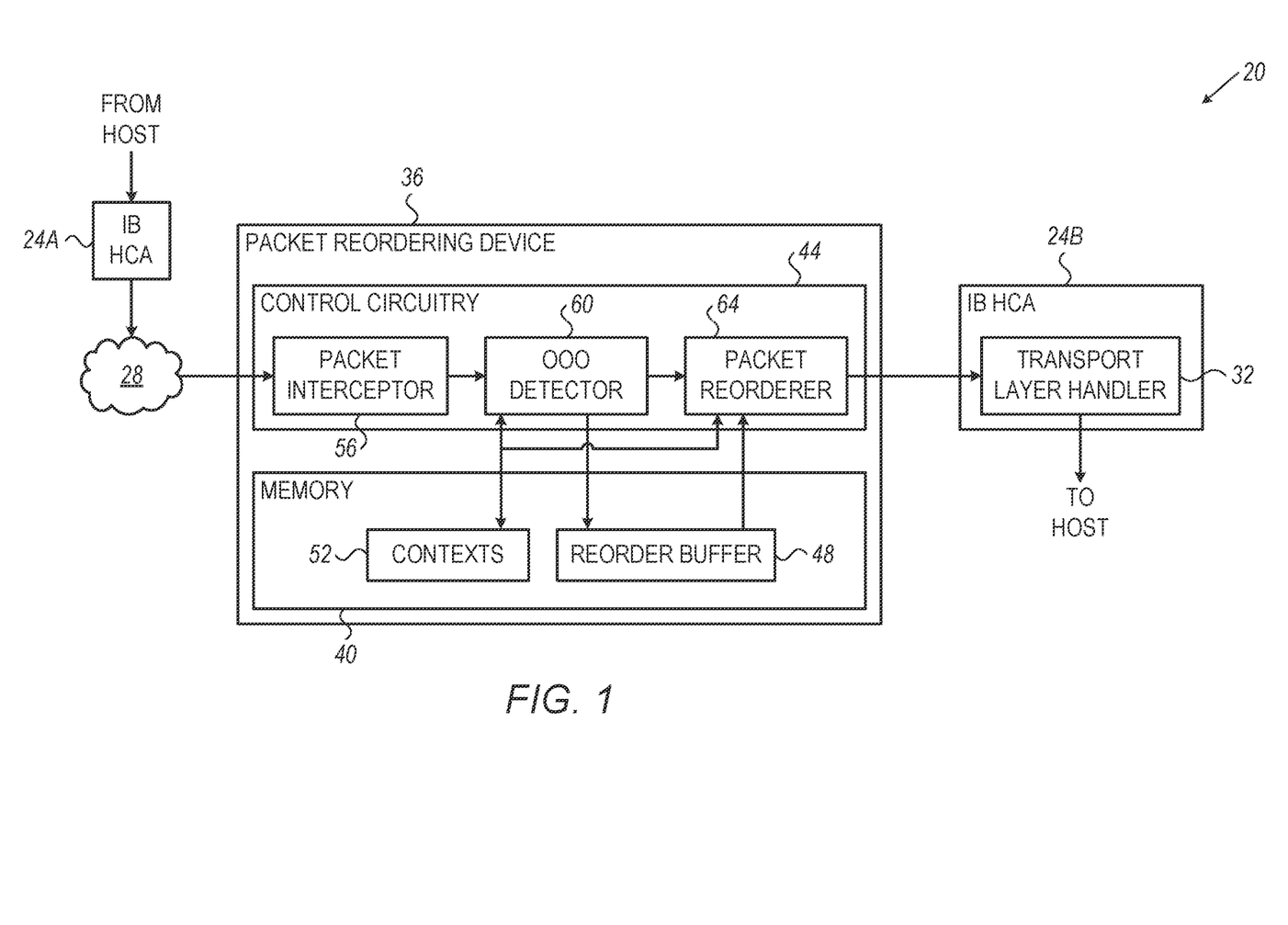
FIG. 1 is a block diagram that schematically illustrates an InfiniBand (IB) communication system that uses packet reordering, in accordance with an embodiment of the present invention.

FIG. 1 is a block diagram that schematically illustrates an IB communication system 20 that uses packet reordering, in accordance with an embodiment of the present invention. System 20 comprises two IB HCAs, denoted 24A and 24B, which communicate with one another over an IB network 28. Each of HCAs 24A and 24B typically serves a respective host. The present example refers mainly to packet transmission from HCA 24A to HCA 24B. HCA 24A is therefore also referred to as a source HCA, and HCA 24B is also referred to as a destination HCA.

Destination HCA 24B comprises a transport-layer handler 32 (also denoted "RXT" herein) that carries out the various transport layer (layer-4) functions of the HCA, including RDMA processing. In accordance with the IB specifications, handler 32 requires that incoming packets arrive in sequential order per flow. Specifically, packets arriving from source HCA 24A are required to arrive in the same order they were sent from the source HCA.

System 20 further comprises a packet reordering device 36 (also denoted "RXO" herein). Reordering device 36 delivers incoming packets to HCA 24B in-order, even when one or more packets arrive from network 28 out-of-order. In an example embodiment, reordering device 36 is located directly in front of (immediately upstream from) HCA 24B, e.g., connected to a port of HCA 24B. In alternative embodiments, reordering device 36 may be located at other suitable locations, e.g., coupled to a port of a last-hop switch in network 28 that leads to HCA 24B.

In the embodiment of FIG. 1, reordering device 36 comprises a memory 40 and control circuitry 44. A region of memory 40 is designated as a reorder buffer (ROB) 48, for temporarily buffering packets that deviate from the expected sequential order. In addition, control circuitry 44 uses memory 40 for storing reorder contexts 52 (also denoted "ROC" herein) of packet flows being processed.

In the present example, control circuitry 44 comprises a packet interceptor 56, an OOO detector 60 and a packet reorderer 64. Packet interceptor 56 intercepts packets that arrive from network 28 and are en-route to HCA 24B. The packets may originate from HCA 24A or from other packet sources (not seen in the figure). OOO detector 60 detects any packets that arrive OOO, i.e., deviate from the expected sequential order of arrival, and stores the deviating packets in ROB 48. Packet reorderer 64 is responsible for reordering the packets of each flow to comply with the expected sequential order of arrival. Packet reorderer 64 forwards the packets in-order (directly from OOO detector 60 or from ROB 48 as appropriate) HCA 24B.

HCAs 24A and 24B typically process the packets of each flow using a respective Queue Pair (QP). Each packet carries a QP index that specifies the flow to which the packet belongs. The terms "flow" and "QP" are therefore used interchangeably herein.

It is noted that the partitioning of control circuitry 44 into a packet interceptor, OOO detector and packet reorderer, as depicted in FIG. 1, and the "division of labor" among these components, is an example configuration that is chosen purely for the sake of clarity. Generally, control circuitry 44 may have any other suitable internal structure.

Figure 2:
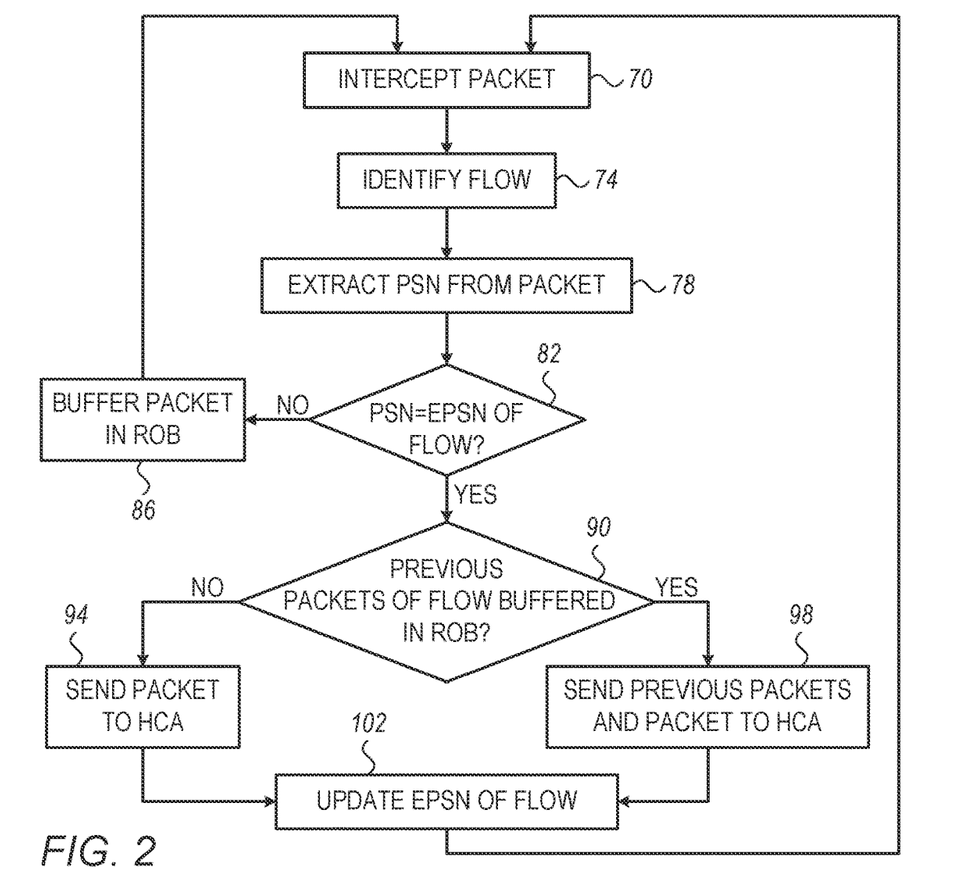
FIG. 2 is a flow chart that schematically illustrates a method for packet reordering in the system of FIG. 1, in accordance with an embodiment of the present invention.

FIG. 2 is a flow chart that schematically illustrates a method for packet reordering, carried out by packet reordering device 36 of FIG. 1, in accordance with an embodiment of the present invention. The method begins with packet interceptor 56 intercepting a packet that is en-route to HCA 24B, at an interception stage 70.

At a flow identification stage 74, OOO detector 60 identifies the flow to which the intercepted packet belongs. Each flow is typically identified by the QP index specified in the intercepted packet. OOO detector 60 identifies the flow to which the packet belongs by extracting the appropriate packet-header fields of the packet. At a PSN extraction stage 78, OOO detector extracts the PSN of the packet.

At an OOO detection stage 82, OOO detector 60 compares the PSN of the packet to the EPSN of the flow. The EPSN is typically stored in memory 40 as part of context 52 of the flow, and OOO detector 60 typically retrieves the EPSN from the context in order to compare it to the PSN of the packet. (The simplified flow of FIG. 2 assumes that a context already exists for this flow, i.e., that the intercepted packet is not the first packet of the flow. Control circuitry 44 typically supports a process of creating a new context 52 upon identifying a new flow, but this process is not depicted in the figure for clarity.

If the PSN of the packet is greater than the EPSN of the flow (meaning that the intercepted packet has arrived out-of-order and should be delayed), OOO detector 60 buffers the packet in ROB 48, at a buffering stage 86. The method then loops back to stage 70 above for intercepting the next packet. (For clarity, the simplified flow of FIG. 2 does not refer to the possibility that the PSN of the packet is smaller than the EPSN of the flow. In such a case, reordering device 36 typically delivers the packet to HCA 24B without additional processing and without modifying the state of ROB 48.)

OOO detector may buffer deviating packets in ROB in any suitable way and using any suitable data structures. In an example embodiment, the deviating packets of each flow are stored in ROB 48 in a linked list associated with the flow. The context 52 of the flow comprises a pointer to the beginning of the linked list associated with the flow.

If the PSN of the packet is equal to the EPSN of the flow (meaning that the intercepted packet has arrived in-order), OOO detector 60 checks whether any previous packets of the same flow are buffered in ROB 48, at a buffering checking stage 90. If not, packet reorderer 64 sends the intercepted packet to HCA 24B, at an intercepted packet sending stage 94. If ROB 48 contains one or more previous packets of the flow, packet reorderer 64 sends the buffered packets to HCA 24B, and only then sends the intercepted packet, at a buffered and intercepted packet sending stage 98.

Packet reorderer 64 increments the EPSN of the flow in context 52, at an EPSN updating stage 102. The method then loops back to stage 70 above for intercepting the next packet.

Figure 3:
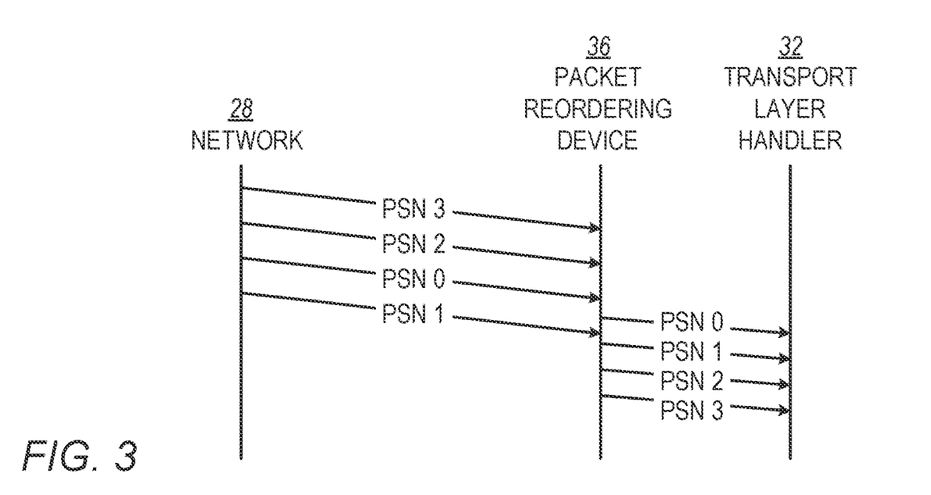
FIG. 3 is a message-flow diagram that schematically illustrates the effect of packet reordering, in accordance with an embodiment of the present invention.

FIG. 3 is a message-flow diagram that schematically illustrates the effect of packet reordering, in accordance with an embodiment of the present invention. The example of FIG. 3 refers to a flow of four packets that are sent from the packet source with PSN=0, PSN=1, PSN=2 and then PSN=3. In the present example, the order of the flow changes as the packets traverse network 28, so that the packet having PSN=3 arrives first at ordering device 36, followed by PSN=2, then PSN=0, and finally PSN=1.

To begin with, the EPSN of this flow in context 52 is EPSN=0. Therefore, upon receiving the packets PSN=3 and PSN=2, ordering device 36 does not forward the packets to transport-layer handler 32 and instead buffers the packets in ROB 48. When the packet having PSN=0 arrives (i.e., when PSN=EPSN), ordering device 36 forwards the packet immediately to transport-layer handler 32, and increments EPSN to become EPSN=1. At this stage, the packet having PSN=1 arrives, and is forwarded immediately since again PSN=EPSN. Only then, ordering device forwards the two buffered packets (PSN=2 followed by PSN=3). As seen, the flow of four packet is received by transport-layer handler 32 in-order.

In some cases, transport-layer handler 32 may refuse to receive a packet due to "Receiver Not Ready" (RNR). Reordering device 36 should be notified of such events, since it is not aware of packet refusal by the transport. In an embodiment, transport-layer handler 32 notifies reordering device 36 of the RNR event, and provides reordering device 36 with (i) an updated EPSN for the flow and (ii) a timeout after which packets of the flow should be flushed. The timeout is typically based on the RNR retry timeout configured in transport-layer handler 32. Until the timeout expires, control circuitry 44 passes packets of the flow to transport-layer handler 32. After the time expires, control circuitry 44 flushes packets of the flow.

In some embodiments, control circuitry 44 flushes packets of a flow if no forward progress is made (i.e., if not new packets of the flow are received) for a predefined duration. The duration is typically set to RTTs, wherein RTT denotes the Round-Trip Time (RTT) between HCA 24A and HCA 24B. Control circuitry 44 may mark such a flow for security reasons.

In some embodiments, the transport layer in HCA 24A should send all packets for all RDMA opcodes with rerouting technologies enabled. No additional ordering requirements should be added by the transport sender. In HCA 24B, if transport-layer handler 32 receives a packet out of order it should request retransmission of the packet whose PSN=EPSN. Optionally, transport-layer handler 32 may also request retransmission of all packets between the EPSN and the received PSN.

Example Data Structure Implementation

In some embodiments, control circuitry 44 maintains two bitmaps that are used in processing packets of multiple flows. Each of the two bitmaps comprises a respective bit per QP (flow) being processed by reordering device 36:

"QP has work" (also referred to as "ROC has work") bitmap. The "QP has work" bit of a flow is set to "1" if reorder buffer 48 contains the packet having the EPSN of the flow, and is set to "0" otherwise. In other words, the "QP has work" bit of a flow is set if the flow needs to be considered when scheduling packets for transmission to HCA 24B. By maintaining this bitmap, control circuitry 44 can quickly determine which flows should be considered for scheduling, without having to scan reorder buffer 48.

"QP has packets in buffer" (also referred to as "ROC has packets in buffer" bitmap). The "QP has packets in buffer" bit of a flow is set to "1" if reorder buffer 48 contains one or more OOO packets of the flow (packets with PSNs that differ from the EPSN of the flow), and is set to "0" otherwise. This bitmap assists processing circuitry 44 in ensuring forward progress, as part of the timeout mechanism described herein.

In an embodiment, the reorder context (ROC) 52 of a given flow comprises the following information:

The current EPSN of the flow.

A pointer to the memory location that stores the linked list of packets of the flow that are buffered in reorder buffer 48.

The current smallest received PSN among the packets of the flow.

A list of PSNs of one or more expected read responses belonging to the flow.

The highest PSN among the PSNs of received ACK packets.

In some embodiments, reorder buffer 48 comprises a pool ("free list") of packet entries. To store a packet of a given flow, control circuitry 44 obtains an entry from the free list and adds the entry to the linked list of the flow. Once a packet that was stored in reorder buffer 48 is sent to HCA 24B, control circuitry 44 returns the corresponding entry to the free list. In an embodiment, reorder buffer 48 uses a suitable caching mechanism comprising both on-chip and off-chip memory. In an embodiment, each packet entry in reorder buffer 48 comprises memory space for metadata, in addition to the buffered packet. The metadata may pertain to the linked list, to previous handling of the packet (e.g., in the pipeline of HCA 24A), or to any other suitable information. Based on simulation results, an example size for reorder buffer 48 is between 200 KB and 1 MB, when using large scale AR. In more sever conditions the required buffer size may reach 2 MB or even 4 MB. These values, however, are given by way of non-limiting example. Any other suitable buffer size can be used.

Reordering Inbound Packets Using Interception of Outbound Packets

In the embodiments described up to this point, reordering device 36 intercepts only inbound packets, i.e., packets sent from HCA 24A to HCA 24B. In some cases, however, reordering device 36 should also intercept outbound packets (packets sent from HCA 24B to HCA 24A) in order to obtain the information needed for reordering the inbound packets.

Consider, for example, a scenario in which HCA 24B (the HCA served by reordering device 36) functions as an RDMA requestor, and HCA 24A functions as an RDMA responder. HCA 24B sends a read request packet to HCA 24A. HCA 24A responds to the read request by sending a sequence of read response packets to HCA 24B. In such a scenario, reordering device 36 does not have an EPSN for comparing to the PSNs of the read responses.

Instead, in some embodiments, reordering device 36 monitors the outgoing packets sent from HCA 24B and intercepts the outgoing read request. Based on the read request, reordering device 36 determines an ordered list of PSNs of the anticipated read responses. Later, when the read responses arrive, reordering device 36 compares the actual PSNs of the read responses to the anticipated PSNs on the list. In this manner, reordering device 36 detects any read responses that arrive out of order, buffers them, and sends the read responses to HCA 24B in the correct sequential order.

Reordering device 36 may use various techniques for deriving the PSNs of the anticipated read responses from the intercepted read request. In an example embodiment, the read request comprises a PSN and a byte count. Reordering device 36 calculates the number of anticipated PSNs by dividing the byte count by the network Maximum Transmission Unit (MTU).

More generally, in some embodiments, control circuitry 44 of reordering device 36 intercepts one or more outbound packets (sent from HCA 24B to HCA 24A). Control circuitry 44 obtains from the intercepted outbound packets a-priori information, and uses the a-priori information to identify inbound packets that arrive OOO.

Figure 4:
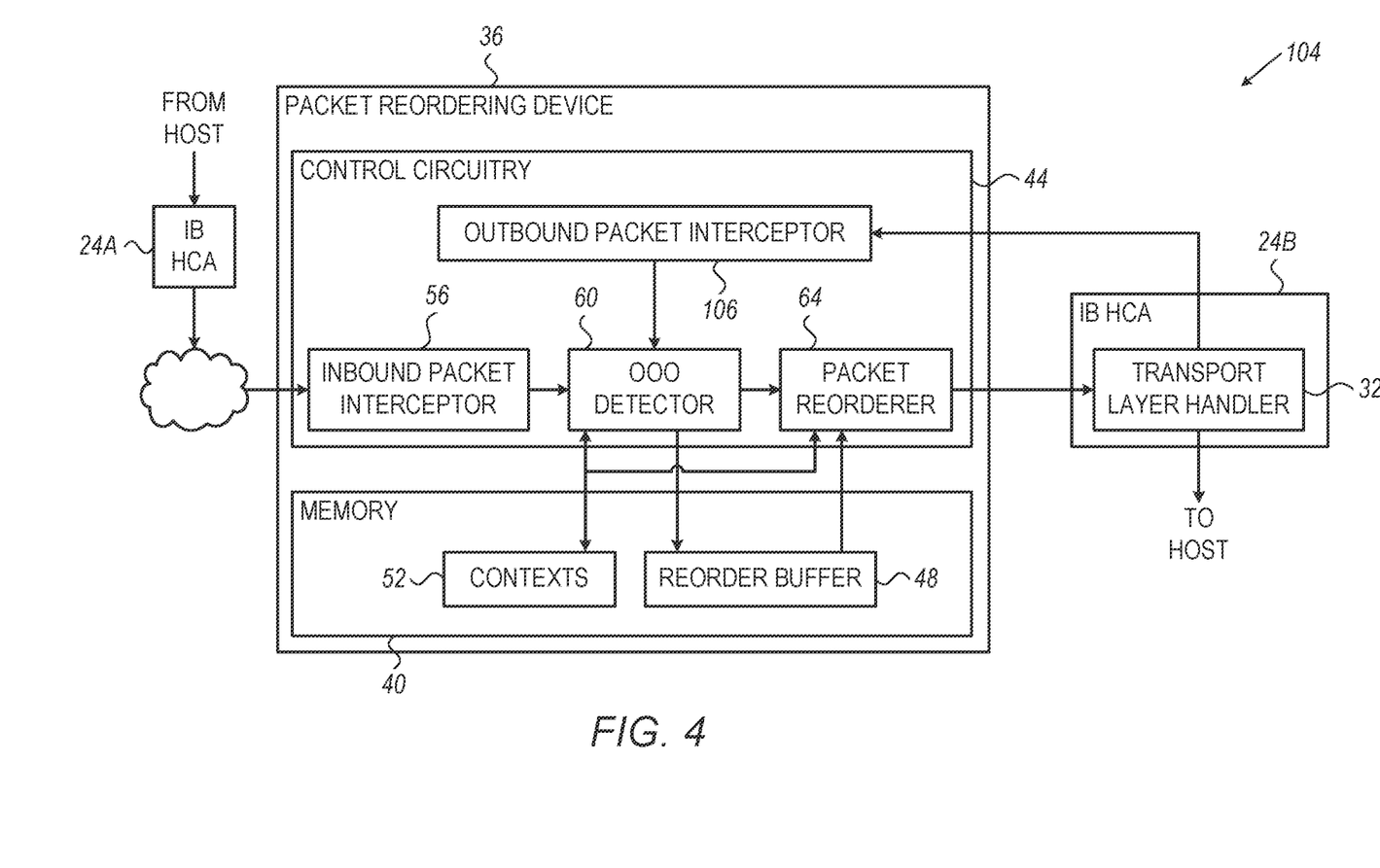
FIG. 4 is a block diagram that schematically illustrates another IB communication system that uses packet reordering including interception of outbound packets, in accordance with an alternative embodiment of the present invention.

FIG. 4 is a block diagram that schematically illustrates an IB communication system 104 that uses packet reordering including interception of outbound packets, in accordance with an alternative embodiment of the present invention. System 104 differs from system 20 (of FIG. 1) in that control circuitry 44 comprises both an inbound packet interceptor 56 and an outbound packet interceptor 106. Outbound packet interceptor 106 intercepts suitable outbound packets, such as read requests in the example above, and provides the a-priori information extracted therefrom to OOO detector 60.

Timer Mechanism for Maintaining Forward Progress

In some embodiments, control circuitry 44 buffers the packets of a given flow only up to a predefined timeout set for the flow. This mechanism is important for maintaining forward progress. Control circuitry 44 typically maintains a respective timer per flow for this purpose. Per flow, control circuitry 44 typically starts the timer upon receiving a new packet for buffering, and resets the timer upon incrementing the EPSN. If the timer indicates that the timeout expired before the buffered packets can be released from the buffer and sent to the HCA (e.g., before the packet whose PSN=EPSN arrives), control circuitry 44 sends the most recently buffered packet of the flow to HCA 24B. As a result, transport-layer handler 32 in HCA 24B will detect the mis-ordered PSN and request retransmission. Such a timeout mechanism is typically performed per flow. In a typical embodiment the timeout duration is set to be on the order of the Round-Trip Time (RTT) between HCA 24A and HCA 24B. Alternatively, however, any other suitable timeout duration can be used.

Handling of Dynamically Connected (Dc) Transport

In some embodiments, one or more of the flows between HCA 24A and HCA 24B are Dynamically Connected (DC) flows. DC transport is a reliable transport protocol in which a connection is established temporarily between HCA 24A and HCA 24B for transferring certain data, the data is transferred, and the connection is then torn down. DC transport is described, for example, in U.S. Pat. No. 8,213,315, whose disclosure is incorporated herein by reference.

A typical DC flow begins with a "connect" packet, followed by one or more data packets, and ends with a "disconnect" packet. The connect packet is sent from the requestor to the responder, requesting the responder to set-up a connection. The disconnect packet is also sent from the requestor to the responder, requesting the responder to tear the connection down.

In some embodiments, reordering device 36 detects packets of a DC flow that are sent from HCA 24A but arrive from network 28 out of order. Reordering device 36 buffers the deviating packets and send the packets of the DC flow to HCA 24B in the correct sequential order. In particular, reordering device 36 handles events that are unique to DC flows, for example an event in which a data packet arrives before the connect packet in a Half Handshake (HHS) mode.

Typically, when receiving a packet belonging to a DC flow, control circuitry 44 of reordering device 36 performs a hash lookup for the connection in order to find the relevant reorder context 52. If no matching context 52 is found, control circuitry 44 allocates a new context 52.

If the packet that triggered allocating the new context is a data packet in HHS mode, then no EPSN is set. The EPSN for a new connection is set when the connect packet arrives. When a disconnect packet arrives, control circuitry 44 deallocates the hash entry and the reorder context 52 for that connection.

If packets belonging to a DC connection remain in reorder buffer 48 for more than a predefined timeout, control circuitry 44 flushes the corresponding context 52. Additionally or alternatively, control circuitry 44 may deallocate and flush a context 52 if a disconnect packet fails to arrive within a predefined timeout.

If control circuitry 44 is unable to allocate a hash entry and a context 52 for a new DC connection, e.g., due to shortage of memory or computational resources, control circuitry 44 passes the packets of the connection directly to HCA 24B. In such a case, circuitry 44 notifies transport-layer handler 32 that reordering has failed and that upon detecting out-of-order arrival, the transport-layer handler should signal the sender (HCA 24A) to disable reordering for this connection.

RDMA Requestor and Responder Flows

Figure 5:
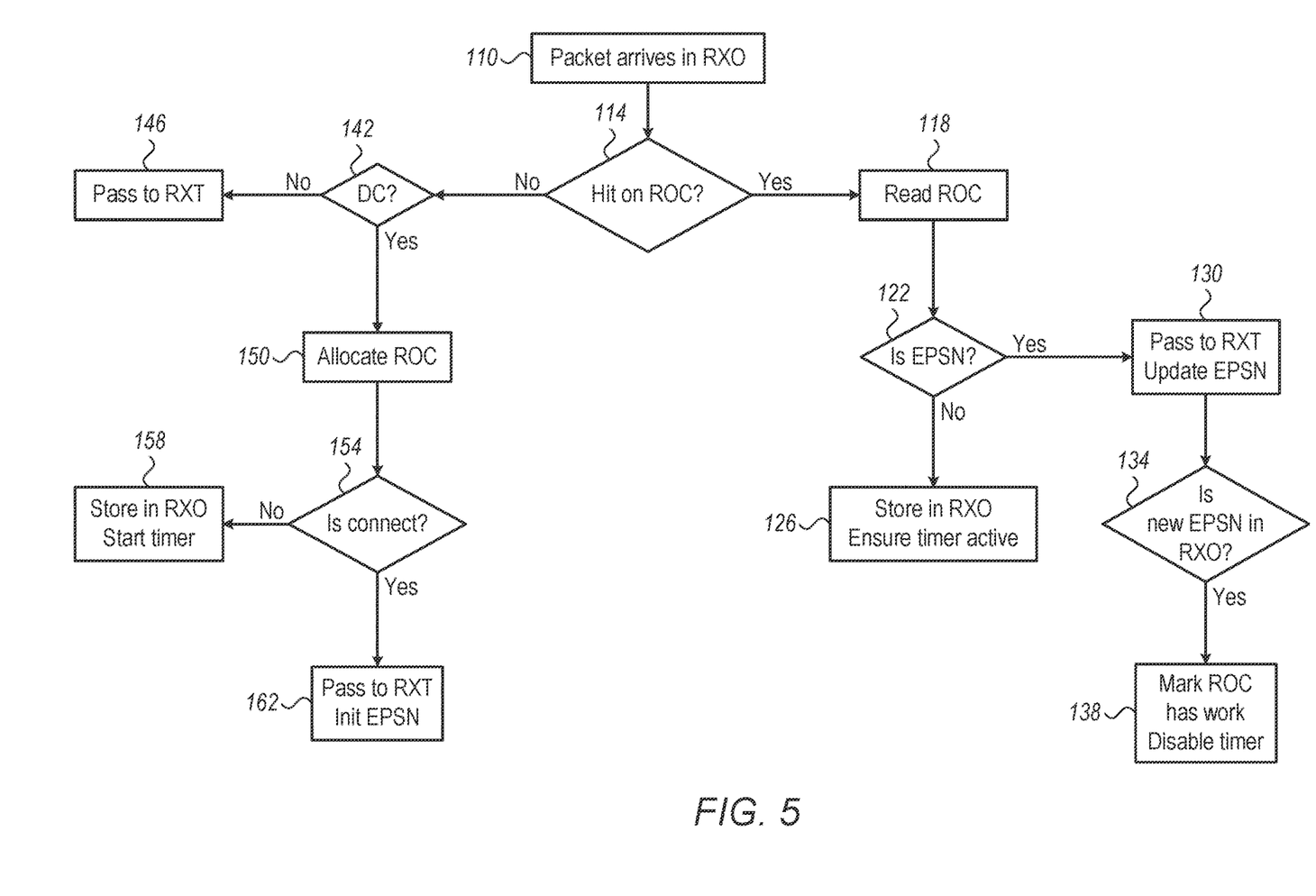
FIG. 5 is a flow chart that schematically illustrates a method for packet reordering in a reordering device coupled to an RDMA requestor, in accordance with an embodiment of the present invention.

FIG. 5 is a flow chart that schematically illustrates a method for packet reordering, in accordance with an embodiment of the present invention. The flow of FIG. 5 is used when reordering device 36 (denoted RXO) is coupled to an RDMA responder (i.e., when HCA 24B serves as an RDMA responder).

The method begins with reordering device 36 receiving a new packet from network 28, at a packet arrival operation 110.

At a context checking operation 114, OOO detector 60 checks whether the packet belongs to a flow for which a reorder context 52 (denoted ROC) exists in memory 40. If a reorder context 52 exists for the packet, OOO detector 60 reads the context 52 from memory, at a context readout operation 118.

At an EPSN checking operation 122, OOO detector 60 checks whether the PSN of the packet is equal to the EPSN of the flow, as recorded in the context 52.

If the PSN of the packet differs from the EPSN of the flow, OOO detector 60 stores the packet in reorder buffer 48, at a buffering operation 126. In addition, OOO detector 60 ensures that the timer of the flow is active (i.e., lets the timer continue running if it is already running, and starts the timer if it is not already running).

If the PSN of the packet equals the EPSN of the flow, OOO detector 60 passes the packet to transport handler 32 (RXT) of HCA 24B, at a forwarding operation 130. In addition, OOO detector 60 increments the EPSN of the flow in reorder context 52.

Then, at a buffer checking operation 134, OOO detector 60 checks whether a packet whose PSN is equal to the updated EPSN is buffered in reorder buffer 48. If so, OOO detector 60 sets the "ROC has work" bit of the flow. As a result, packet reorderer 64 will pass any packet of the flow that is buffered in buffer 48 to HCA 24B. At this stage, OOO detector 60 disables the timer of the flow.

Reference is now made again to context checking operation 114. If the outcome of this operation is that no reorder context 52 is found for the packet, OOO detector 60 checks whether the packet belongs to a Dynamically Connected (DC) flow, at a DC checking operation 142. If not, packet reorderer 64 passes the packet to HCA 24B, at a forwarding operation 146.

If the packet does belong to a DC flow, OOO detector 60 allocates a new reorder context 52 (ROC) to the packet, at a ROC creation operation 150. At a connect-packet checking operation 154, OOO detector 60 checks whether the packet is a connect packet. If so, at a forwarding & initiation operation 162, packet reorderer 64 passes the packet to HCA 24B, and OOO detector 60 initializes an EPSN for the DC flow in the newly-created context 52.

If the packet is not a connect packet (i.e., if the packet is a data packet or a disconnect packet), OOO detector 60 stores the packet in reorder buffer 48, at a DC buffering operation 158, and starts the timer of the flow.

Figure 6:
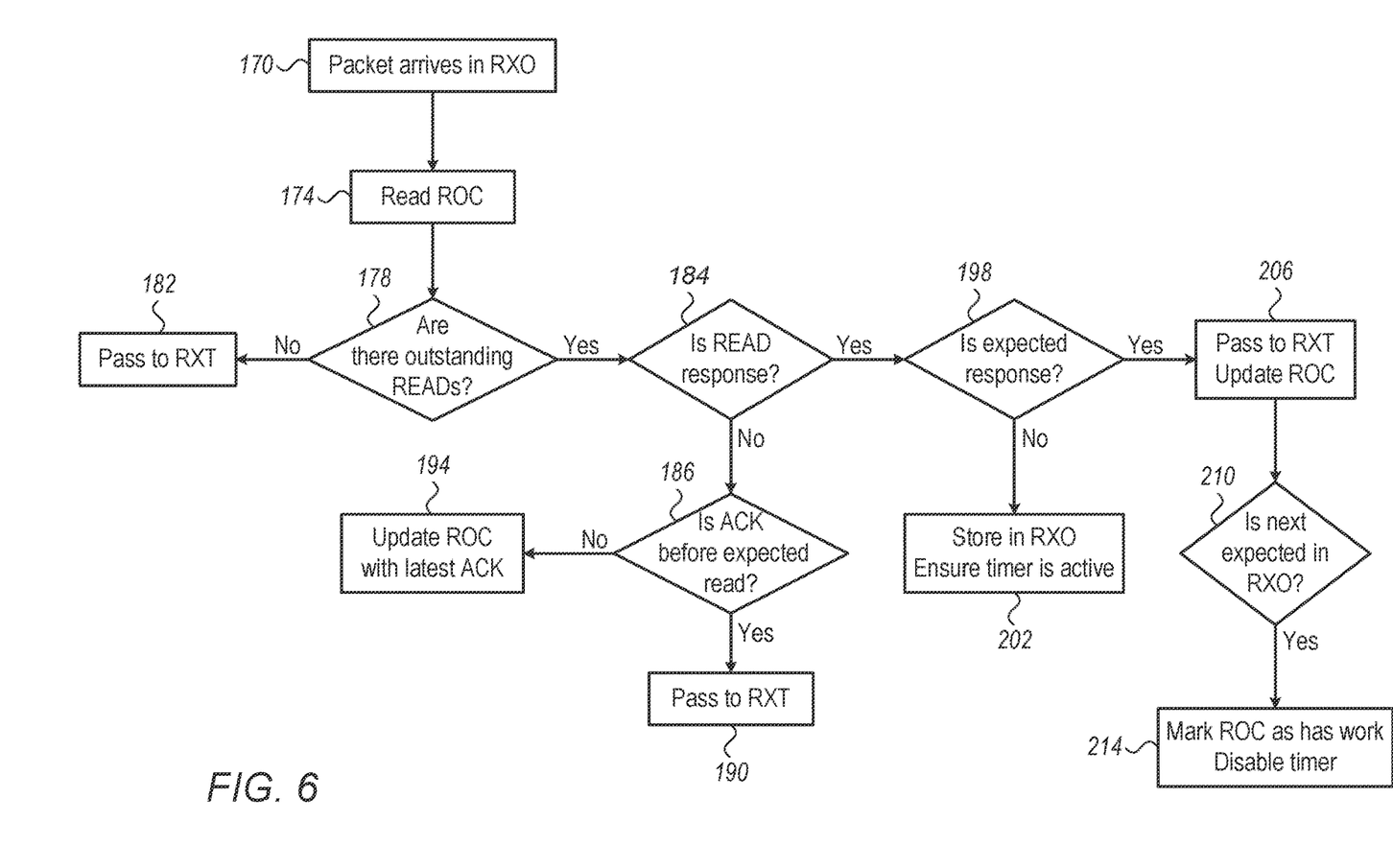
FIG. 6 is a flow chart that schematically illustrates a method for packet reordering in a reordering device coupled to an RDMA responder, in accordance with an embodiment of the present invention.

FIG. 6 is a flow chart that schematically illustrates a method for packet reordering, in accordance with another embodiment of the present invention. The flow of FIG. 6 is used when reordering device 36 is coupled to an RDMA requestor (i.e., when HCA 24B serves as an RDMA requestor).

The method begins with reordering device 36 receiving a new packet from network 28, at a packet arrival operation 170.

At a context readout operation 174, packet interceptor 56 identifies the flow to which the packet belongs, and OOO detector 60 reads the context 52 of this flow from memory.

At an outstanding read checking stage 178, OOO detector 60 checks whether there any read requests are currently pending (i.e., whether HCA 24B has any read requests that are still waiting for one or more read responses). For this purpose, OOO detector 60 checks whether reordering device 36 has any non-empty list of PSNs of anticipated read responses (obtained from intercepting outgoing packets, as explained above).

If no read requests are currently pending, packet reorderer 64 passes the packet to HCA 24B, at a forwarding stage 182. If one or more read requests are currently pending, OOO detector 60 checks whether the received packet is a read response packet, at a read response checking stage 184. If so, OOO detector 60 proceeds to check whether the read response is the next expected read response, at a next response checking stage 198. For this purpose, OOO detector 60 checks whether the PSN of the packet (which is already known to be a read response packet) equals the first PSN on the list of anticipated PSNs.

If the read response packet is not the next expected read response, OOO detector 60 stores the packet in reorder buffer 48, and ensures the timer of the flow is active, at a response buffering stage 202.

If the read response packet is the next expected read response, packet reorderer 64 passes the packet to HCA 24B, at a response forwarding stage 206. At this stage OOO detector 60 updates the context 52 of the flow, e.g., updates a window (range) of anticipated PSNs that is maintained in the context of the flow.

At an ROC checking stage 210, OOO detector 60 then checks whether the next read response on the list is buffered in reorder buffer 48. If so, OOO detector 60 sets the "ROC has work" bit of the flow to "1", and disables the timer of the flow, at a marking stage 214.

Reference is now made back to read response checking stage 184. If the outcome of this stage is that the received packet is not a read response, OOO detector 60 proceeds to check whether the packet is an ACK that (i) acknowledges a message that was sent from HCA 24B after the read request, and (ii) arrived before one of the expected read responses of that read request, at an ACK-before-read checking stage 186. If so, reorderer 64 passes the packet to HCA 24B, at a passing stage 190. Otherwise, OOO detector 194 updates the context 52 of the flow with the latest ACK.

Relaxed Reordering Mode

In some embodiments, reordering device 36 supports a "relaxed reordering mode", which permits packets of one or more predefined types to deviate from the expected sequential order. This mode is typically configured (e.g., activated or deactivated) per flow. Example packet types for which reordering can be relaxed are RDMA writes and RDMA read responses.

In an example embodiment, reordering device 36 exposes an Application Programming Interface (API) that enables users to configure, per flow, whether the flow (i) does not support reordering, (ii) supports reordering in full, or (iii) supports relaxed ordering.

In an example implementation, control circuitry 44 disregards (or does not perform) PSN comparison for packets that are subject to relaxed reordering. Control circuitry 44 also keeps small contexts for the packets that are sent in the correct order, in order to maintain proper ordering with other packets (packets that are not excluded from proper ordering).

The configurations of systems 20 and 104, and the configurations of their various components, e.g., packet reordering device 36, shown in FIGS. 1 and 4, are example configurations that are depicted purely for the sake of conceptual clarity. Any other suitable configurations can be used in alternative embodiments. Elements that are not mandatory for understanding of the disclosed techniques have been omitted from the figures for the sake of clarity.

The various elements of systems 20 and 104, and the elements of their components, e.g., packet reordering device 36, shown in FIGS. 1 and 4, may be implemented using software, using suitable hardware such as in one or more Application-Specific Integrated Circuits (ASIC) or Field-Programmable Gate Arrays (FPGA), or using a combination of software and hardware elements. Memory 40 of packet reordering device 36 may comprise any suitable type of memory, e.g., Random Access Memory (RAM).

In some embodiments, certain functions of packet reordering device 36, e.g., certain functions of control circuitry 44, may be implemented using a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Although the embodiments described herein mainly address RDMA, the methods and systems described herein can also be used in other applications, such as in any other transport-layer protocol in which flows can be identified by parsing transport-layer headers.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
a memory; and
control circuitry, to:
receive packets, which are en-route to undergo transport-layer processing in a network device in accordance with a transport protocol that requires arrival of the packets in a sequential order;
detect that one or more of the packets deviate from the sequential order;
buffer the one or more deviating packets in the memory;
using the memory, reorder the packets and provide the packets in the sequential order to the network device; and
in response to detecting that a time that elapsed since initiating buffering of the one or more deviating packets exceeds a defined timeout, cause the network device to request retransmission of one or more packets that precede the one or more deviating packets.

2. The apparatus according to claim 1, wherein the transport protocol is Remote Direct Memory Access (RDMA).

3. The apparatus according to claim 1, wherein, in accordance with the transport protocol, the sequential order is defined by packet serial numbers (PSNs) specified in the packets.

4. The apparatus according to claim 1, wherein the control circuitry is to reorder and provide the packets, by (i) retaining the one or more deviating packets in the memory until arrival of the one or more packets that precede the one or more deviating packets in the sequential order, and only then (ii) providing the one or more packets that precede the one or more deviating packets, followed by the one or more deviating packets.

5. The apparatus according to claim 1, wherein the received packets comprise respective packet serial numbers (PSNs) that specify the sequential order, and wherein the control circuitry is to maintain an Expected PSN (EPSN), and to detect that a received packet deviates from the sequential order by detecting that the PSN of the packet differs from the EPSN.

6. The apparatus according to claim 1, wherein the received packets comprise respective packet serial numbers (PSNs) that specify the sequential order, wherein at least some of the received packets are read responses that are received in response to a read request from the network device, and wherein the control circuitry is to obtain from the network device a-priori information indicative of the PSNs of the read responses, and to decide that one or more of the packets deviate from the sequential order based on the a-priori information.

7. The apparatus according to claim 6, wherein the control circuitry is to obtain the a-priori information by monitoring the read request sent by the network device.

8. The apparatus according to claim 1, wherein, in providing the packets to the network device, the control circuitry is to permit packets of one or more predefined types to deviate from the sequential order.

9. The apparatus according to claim 1, wherein the control circuitry is to detect that a received packet deviates from the sequential order, by identifying that the packet is a data packet belonging to a Dynamically Connected (DC) flow for which a connection- request packet was not yet received.

10. The apparatus according to claim 1, wherein the received packets are associated with multiple flows, and wherein the control circuitry is to detect and buffer the deviating packets, and to reorder and provide the packets, separately for each of the flows.

11. The apparatus according to claim 10, wherein the control circuitry is to maintain, per flow, a respective context that stores one or more of:
an expected packet serial number (EPSN) for the flow;
a pointer to a memory location that stores the one or more deviating packets belonging to the flow;
   a current smallest received packet serial number (PSN) among the packets of the flow;
a list of PSNs of one or more expected read responses; and
a highest PSN among the PSNs of received acknowledgement packets.

12. A method, comprising:
receiving packets, which are en-route to undergo transport-layer processing in a network device in accordance with a transport protocol that requires arrival of the packets in a sequential order, wherein the received packets comprising respective packet serial numbers (PSNs) (that specify the sequential order, and wherein at least some of the received packets are read responses that are received in response to a read request from the network device;
detecting that one or more of the packets deviate from the sequential order by (i) obtaining from the network device a-priori information indicative of the PSNs of the read responses, and (ii) deciding that one or more of the packets deviate from the sequential order based on the a-priori information;
buffering the one or more deviating packets in a memory; and
using the memory, reordering the packets and providing the packets in the sequential order to the network device.

13. The method according to claim 12, wherein the transport protocol is Remote Direct Memory Access (RDMA).

14. The method according to claim 12, wherein reordering and providing the packets comprise (i) retaining the one or more deviating packets in the memory until arrival of one or more packets that precede the one or more deviating packets in the sequential order, and only then (ii) providing the one or more packets that precede the one or more deviating packets, followed by the one or more deviating packets.

15. The method according to claim 12, wherein detecting that one or more packets deviate from the sequential order comprises (i) maintaining an Expected PSN (EPSN) , and (ii) detecting that a received packet deviates from the sequential order by detecting that the PSN of the packet differs from the EPSN.

16. The method according to claim 12, further comprising detecting that a time that elapsed since initiating buffering of the one or more deviating packets exceeds a defined timeout, and in response causing the network device to request retransmission of the one or more packets that precede the one or more deviating packets.

17. The method according to claim 12, wherein obtaining the a-priori information comprises monitoring the read request sent by the network device.

18. The method according to claim 12, wherein providing the packets to the network device comprises permitting packets of one or more predefined types to deviate from the sequential order.

19. The method according to claim 12, wherein detecting that a received packet deviates from n the sequential order comprises identifying that the packet is a data packet belonging to a Dynamically Connected (DC) flow for which a connection-request packet was not yet received.

20. The method according to claim 12, wherein the received packets are associated with multiple flows, and wherein detecting the deviating packets, buffer the deviating packets, and reordering and providing the packets, are performed separately for each of the flows.

21. The method according to claim 20, further comprising maintaining, per flow, a respective context that stores one or more of:
an expected packet serial number (EPSN) for the flow;
a pointer to a memory location that stores the one or more deviating packets belonging to the flow;
a current smallest received packet serial number (PSN) among the packets of the flow;
a list of PSNs of one or more expected read responses; and
a highest PSN among the PSNs of received acknowledgement packets.

22. An apparatus, comprising:
a memory; and
control circuitry, configured to:
   receive packets, which are en-route to undergo transport-layer processing in a network device in accordance with a transport protocol that requires arrival of the packets in a sequential order, wherein the received packets comprise respective packet serial numbers (PSNs) that specify the sequential order, and wherein at least some of the received packets are read responses that are received in response to a read request from the network device;
   detect that one or more of the packets deviate from the sequential order, by (i) obtaining from the network device a-priori information indicative of the PSNs of the read responses, and (ii) deciding that one or more of the packets deviate from the sequential order based on the a-priori information;
   buffer the one or more deviating packets in the memory; and
   using the memory, reorder the packets and provide the packets in the sequential order to the network device.

23. A method, comprising:
receiving packets, which are en-route to undergo transport-layer processing in a network device in accordance with a transport protocol that requires arrival of the packets in a sequential order;
detecting that a received packet deviates from the sequential order, by identifying that the packet is a data packet belonging to a Dynamically Connected (DC) flow for which a connection-request packet was not yet received;
buffering the deviating packet in a memory; and
using the memory, reordering the packets and providing the packets in the sequential order to the network device.

* * * * *